Sept. 13, 1927. 1,642,346
H. F. H. UYTJENS
CHANGE-SPEED GEAR FOR ROTATION IN TWO DIRECTIONS AND WITH
DIRECT COUPLING, NEUTRAL POSITION, AND BRAKE
Filed April 12, 1926
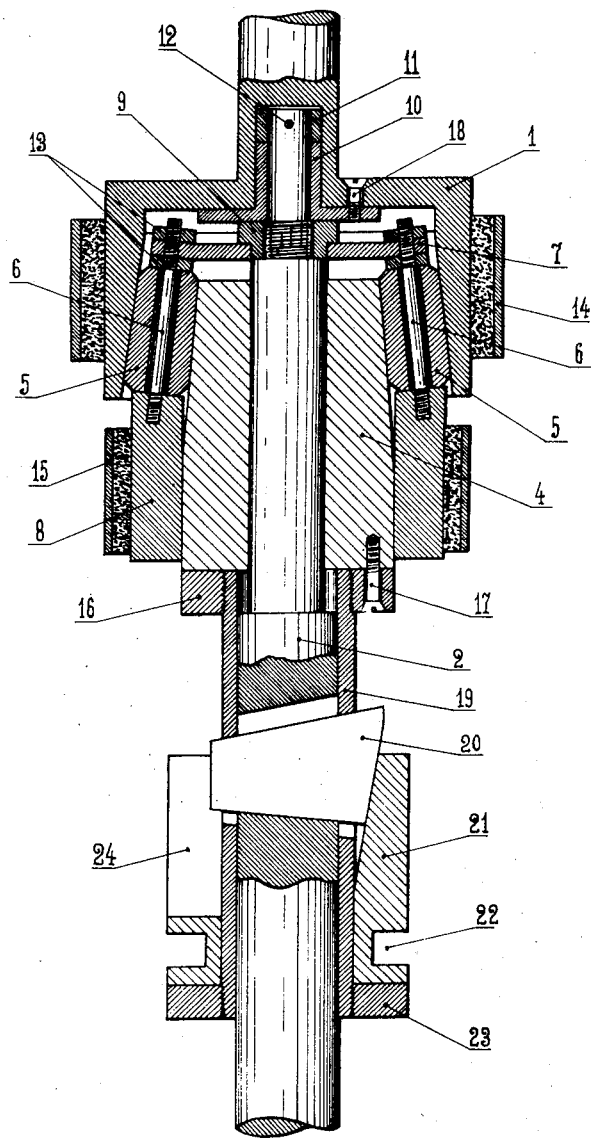

Patented Sept. 13, 1927.

1,642,346

UNITED STATES PATENT OFFICE.

HENDRICUS FRANCISCUS HUBERTUS UYTJENS, OF SPAUBEEK, NETHERLANDS.

CHANGE-SPEED GEAR FOR ROTATION IN TWO DIRECTIONS AND WITH DIRECT COUPLING, NEUTRAL POSITION, AND BRAKE.

Application filed April 12, 1926, Serial No. 101,515, and in the Netherlands March 16, 1926.

My invention consists in improvements in change speed gears for rotation in both directions and with direct coupling, neutral position and brake. The object of the invention is a reliable and easily to actuate, noiseless and frictionless acting mechanism, especially for motor vehicles, motors and locomotives.

In order to obtain this purpose the arrangement is such, that on one shaft a slidable conical member is situated, between which conical member and a drum, attached to a shaft, which must be coupled with the first mentioned shaft, a number of rollers is provided in such a way, that by pushing the conical member inwardly, the rollers are more or less pressed between the conical part and the drum.

In order that the nature of my invention and how it can be performed may be well understood, I will describe it with reference to the accompanying drawings in which Fig. 1 is a figure view of a change speed gear constructed and arranged in accordance with my invention.

In the drawing 1 is the drum with a conical inner surface in the hub of which drum the driving shaft 2 extends. This shaft 2 is rotatably guided in a bronze bush 10. The bush 10 is attached to the drum by screws 18, whilst a ring 11 and a pin 12 mounted in this ring, prevents the displacement of the driving shaft 2 in the drum 1. The conical member 4 slidable along the driving shaft 2 is fixed by a screw ring 16 and screws 17 to the bush 19. When the transmission parts are worn, the screws 17 are released, the ring 16 is screwed inwardly on the bush 19 and then the screws are mounted again. In the driving shaft 2 a double key 20, that is a key with two wedgelike shaped sides, is movable by means of an adjusting ring 21, which ring is provided with a circular slot 22 for engagement with the actuating ring or fork (not shown), in order that the adjusting ring 21 can be moved forwardly and backwardly along the shaft 2, pressing the key 20 inwardly and outwardly in the bush 19. By this movement of the key, the bush 19 and the conical member 4 are pressed inwardly, so that the metal rollers 5, rotatably mounted upon pins 6, are pressed between the conical member 4 and the conical inner surface of the drum 1. The pins 6 are screwed into a ring 8 and extend with their other end into a disc 7; the ends of these pins being maintained in this disc 7 by nuts 13. The disc 7 serves to center the ring 8 and rotates about a ring 9, supported by a bush 10, thereby preventing the shaft 2 from moving into axial direction. A ring 23 is screwed upon the outer end of the bush 19. If the conical member 4 is pressed so strong inwardly that it cannot move back automatically, the same will be released by drawing back the ring 21 against the ring 23. In order that the adjusting ring 21 may be moved along the bush 19, a slot 24 is provided in the ring 21. A brakeband 14 surrounding the drum 1 is provided with a lining for braking the drum and the gear mechanism connected with the same, whilst a brake 15 is mounted upon the ring 8, in order to be able to rotate in opposite direction with a different speed.

The change speed gear acts in the following manner.

In the drawing the adjusting ring 21 is shown in the extreme drawn out position, corresponding with the neutral position. By pressing forwardly the adjusting ring 21, the key is pressed inwardly, thereby pushing forwardly the bush 19 with the conical member 4 along the shaft 2, so that the rollers 5 are pressed between the conical member and the inner surface of the drum 1. As soon as the pressure has reached a value larger, than the resistance met by the drum, the latter will rotate in the same direction as the driving shaft. The stronger the rollers are pressed between the drum and the conical member, the more power will be transmitted to the drum, so that the same will rotate with greater speed, until the drum will have the same rotation speed as the driving shaft, which position of the rollers corresponds with direct coupling.

Between the neutral position and direct coupling all possible speeds may be attained. In the position of direct coupling the pressure as exerted must be chosen for safety's sake somewhat more intensive as theoretically required, but the clamping remains always so that when suddenly a large resistance is encountered, slipping of the rollers on drum and conical member is still possible.

If a rotation of the drum in reverse direction is required, the brake band on the ring 8 is actuated before the conical part 4 is pressed inwardly, so that the ring is stopped. By pressing the conical member inwardly, it is in this way possible to impart also different speeds to the drum in reverse direction. It is however observed that in the reverse coupling, the pressure exerted to the rollers need not be so strong.

I claim:

1. In a variable speed transmission for rotation in two directions and with direct coupling, neutral position and brake, comprising a driven member and a driving member, a conical member slidably mounted upon one of the first named members, a cage surrounding partly said conical member and rotatably mounted upon the same member as said conical member, a drum mounted upon the other of the first named members and surrounding said cage, revoluble anti-friction members carried by said cage and continuously contacting with the inner surface of the drum and means for shifting the said conical member in the length direction of the member for pressing the said anti-friction members more or less against the inner surface of the said drum for changing the ratio of speed of rotation of one member with relation to the other.

2. In a variable speed transmission for rotation in two directions and with direct coupling, neutral position and brake, comprising driven member and a driving member, a conical member slidably mounted upon the driving member, a cage surrounding partly said conical member and rotatably mounted on said driving member, a drum mounted upon the driven member and surrounding said cage, revoluble anti-friction members carried by said cage and continuously contacting with the inner surface of the drum and means to shift the said conical member in the length direction of the member in order to press the said revoluble antifriction members more or less against the inner surface of the said drum for changing the ratio of speed of rotation of one member with relation to the other, the said cage containing a conical part carrying the anti-friction members, the cylindrical ring being provided with a brake mechanism for locking the cage rotating said anti-friction members from the driving member in a reverse direction to that of the said member so as to rotate the drum and the driven member in the reverse direction to that of the driving member with variable speed.

In testimony whereof, I have signed my name to this specification.

HENDRICUS FRANCISCUS HUBERTUS UYTJENS.